(12) United States Patent
Wiese et al.

(10) Patent No.: US 7,490,037 B2
(45) Date of Patent: Feb. 10, 2009

(54) METHOD AND APPARATUS FOR ENCODING SIGNALS

(75) Inventors: Detlef Wiese, Freising (DE); Joerg Rimkus, Flensburg (DE)

(73) Assignee: MAYAH Communications GmbH, Hallbergmoos (DE)

( * ) Notice: Subject to any disclaimer, the term of this patent is extended or adjusted under 35 U.S.C. 154(b) by 414 days.

(21) Appl. No.: 11/143,011

(22) Filed: Jun. 2, 2005

(65) Prior Publication Data
US 2005/0240415 A1    Oct. 27, 2005

Related U.S. Application Data

(63) Continuation of application No. 09/462,049, filed on Apr. 3, 2000, now abandoned.

(51) Int. Cl.
*G10L 19/00* (2006.01)
(52) U.S. Cl. .................. 704/230; 704/501; 704/504
(58) Field of Classification Search ............ 704/200.1, 704/228, 500, 501, 502, 503, 504, 229, 230, 704/201; 700/94; 369/59.12, 275.3
See application file for complete search history.

(56) References Cited

U.S. PATENT DOCUMENTS

| | | | | |
|---|---|---|---|---|
| 4,899,384 A | * | 2/1990 | Crouse et al. | 704/229 |
| 5,199,078 A | * | 3/1993 | Orglmeister | 704/230 |
| 5,333,155 A | * | 7/1994 | Dambacher | 375/240 |
| 5,509,017 A | * | 4/1996 | Brandenburg et al. | 370/477 |
| 5,621,660 A | * | 4/1997 | Chaddha et al. | 709/247 |
| 6,138,051 A | * | 10/2000 | Dieterich | 700/94 |

FOREIGN PATENT DOCUMENTS

| | | | |
|---|---|---|---|
| EP | 327101 A2 | * | 8/1989 |
| EP | 417739 A2 | * | 3/1991 |
| GB | 2225516 | | 5/1990 |

* cited by examiner

*Primary Examiner*—Huyen X. Vo
(74) *Attorney, Agent, or Firm*—Reed Smith LLP

(57) ABSTRACT

The invention concerns a method of encoding signals, in particular digitized audio signals, with an encoding device for encoding the signal in an encoding format and a processing device for processing the encoded signal.

Methods of that kind are known for example from European patent specification No 290 581. In that case, in the bit rate-reducing encoding of audio signals which are already present in digitized form, for example 48 kHz sampling frequency/16-bit resolution, psycho-acoustic phenomena of the perception of audio signals are used in such a way that the original bit rate of the audio signals is considerably reduced. Such methods are also familiar and standardised under the heading of 'source encoding' (ISO 11172 and 11318).

The object of the invention is to provide a method of the kind set forth in the opening part of this specification, which resolves the above-indicated problems and in which re-coding operations, once encoding has been effected, are very substantially avoided.

32 Claims, 5 Drawing Sheets

METHOD AND APPARATUS FOR ENCODING SIGNALS

CROSS-REFERENCE TO RELATED APPLICATIONS

This application claims priority of PCT Application Serial No. PCT/EP98/03981 filed Jun. 30, 1998, German Application 197 27 938.4 filed on Jul. 1, 1997 and is a continuation application of U.S. patent application Ser. No. 09/462,049 filed on Apr. 3, 2000 now abandoned.

BACKGROUND OF THE INVENTION a) Field of the Invention

The invention concerns a method of encoding signals, in particular digitized audio signals, with an encoding device for encoding the signal in an encoding format and a processing device for processing the encoded signal.

b) Description of the Related Art

Methods of that kind are known for example from European patent specification No 290 581. In that case, in the bit rate-reducing encoding of audio signals which are already present in digitized form, for example 48 kHz sampling frequency/16-bit resolution, psycho-acoustic phenomena of the perception of audio signals are used in such a way that the original bit rate of the audio signals is considerably reduced. Such methods are also familiar and standardized under the heading of 'source encoding' (ISO 11172 and 11318).

With some encoding methods there is also the option of encoding the signal in a given transmission or storage format in order then to be able to transmit and/or store the signal. That encoding however frequently gives rise to the necessity for the signals to be re-coded in regard to the transmission or storage format used as the transmission channel which is then actually employed or the storage device which is actually used employs another encoding format. If the necessary re-coding algorithms for re-coding the signal for adaptation to the actual encoding format are not available, the result of this is that complete decoding of the signal into a linear, non-data-reduced format and subsequent encoding to the desired format have to be implemented. That frequently results in quality losses of greater or lesser severity. Either that expensive path is adopted or adaptation is not possible.

OBJECT AND SUMMARY OF THE INVENTION

The primary object of the present invention is to provide a method of the kind set forth in the opening part of this specification, which resolves the above-indicated problems and in which re-coding operations, once encoding has been effected, are very substantially avoided.

In accordance with the invention that object is attained in that, in a method of the kind set forth in the opening part of this specification, the encoding format is determined in dependence on the properties of the processing device.

With the method according to the invention it is particularly advantageous that encoding is already effected at the transmission end, taking account of the properties of the connected devices for subjecting the signals for further processing. In other words, it is already possible in the encoding procedure to take account of and use the encoding formats which are necessary for the connected items of equipment. In particular by means of the present method it is possible to implement encoding which is adapted to the possibilities of the selected transmission channel and decoding at the reception end, so that the signal can be transmitted and received or decoded at the maximum possible quality.

Furthermore the method according to the invention makes it possible in any case to avoid expensive re-coding of the encoded signal as the signal is encoded from the outset in the correct format, that is to say the format which corresponds to the connected items of equipment, for example the connected storage device or the connected transmission channel. The method therefore not only permits higher-quality transmission of signals but also faster transmission.

A particularly advantageous embodiment of the invention is distinguished in that, prior to establishing the encoding algorithm, the properties or the property parameters of the selected transmission and/or storage and/or decoding devices are ascertained by one or more test signals directed to the corresponding device. In that way by virtue of the method according to the invention it is possible for the encoding format to be used or the encoding algorithm to be applied to be directly adapted to the devices which are actually connected in each case, such as for example transmission channels, storage means or decoding devices at the reception end. With the method according to the invention therefore, a person who would like to transmit signals, by virtue of the test signal, no longer needs to establish or make adjustments for connected items of equipment which are involved, such as for example transmission channel, storage device or decoding devices at the reception end, when that person would like to transmit or send signals. With the solution according to the invention however it is possible, prior to the actual encoding by hand, to preset the corresponding parameters for selection of the desired encoding format in order for example to permit transmission even with devices which are not recognised by means of the test signal. In any case therefore the method according to the invention permits adaptation of the encoding format to the items of equipment used.

If the signal to be sent is a digitized audio signal and the signal is present in source-encoded form, that is to say in bit rate-reduced form, the method according to the invention makes the following possible: if transmission and/or storage devices of various capacities are available, then, having regard to the amount of data which is still to be transmitted after bit rate-reduced encoding, it is possible to select a transmission channel which enjoys appropriate capacity or a storage device which enjoys appropriate capacity. Thus for example in the case of signals of relatively low quality or when the demands in terms of reception quality are relatively low, that is to say with a higher level of redundancy, it is possible to adopt a transmission channel of lower capacity and thus possibly save cost.

The invention is used for example in regard to transmission or storage of data-reduced audio signals which are present for example in the formats G.711, G.722, MPEG ½-layer 1, 2, 3 or MPEG 4. The invention can be applied to all systems, for example, transformation and subband encoding methods, adaptive and non-adaptive pulse code modulation methods, with linear and non-linear quantization, combinations thereof and other audio encoding methods.

The invention also makes use of certain properties of such methods. Typically audio signals which are to be transmitted or stored and which are data-reduced require only a low transmission or storage capacity. The result of this is that audio signals can be transmitted even over narrow-band lines in real time. In that case the data rate of the audio signals is so selected that they satisfy either the qualitative claims or the economic and commercial requirements. A high data rate has a correspondingly high quality, on the other hand it also requires a larger channel or storage capacity, which in turn gives rise to higher costs. When dealing with very narrowband transmission channels, if wide-band channels are not available, the transmission of high-quality audio signals, that is to say audio signals having large quantities of data, are implemented in an n-times real time with n>1.

Therefore a particularly preferred embodiment of the invention is one in which bit rate-reduced audio signals are to be sent and a plurality of transmission channels and/or bit rates are available for transmission of the audio signals. Then, by virtue of the method according to the invention, the transmission channel and/or the bit rate in the transmission of the audio signals can be selected in such a way that the audio signal can be transmitted in real time or even faster than real time.

Advantageous developments and configurations of the method according to the invention are set forth in the appendant claims.

Another object of the present invention is to provide an apparatus for encoding signals, which avoids the problems set forth in the opening part of this specification and in which re-coding of the signal after encoding has been effected is no longer necessary.

In accordance with the invention that object is attained by an apparatus for encoding signals, having a control device which presets the encoding format to be used for the encoding operation in dependence on the properties of a processing device for subsequent processing of the signals.

The advantage of the apparatus according to the invention is that the encoding format takes account from the outset of further processing, that is to say for example transmission or storage of the signal. That means that the signal cannot undergo incorrect encoding in the sense that the signal is encoded in an encoding format which does not suit the selected transmission or further processing devices, such as for example a storage device.

In a particularly preferred embodiment of the invention it is possible by means of a control device having a test signal generator which emits a test signal, by means of which the control device establishes the properties of the connected device, thus for example the bit rate of the connected transmission channel, suitably to automatically select the encoding format by means of the control device. The user therefore does not need to intervene manually in the procedure for selecting the desired encoding format. That therefore advantageously affords a considerable simplification in operation. For, on the one hand there is now no need for manual setting of the encoding format and in addition the user of the apparatus is not embarrassed even if that person—for example as a lay person—does not have the appropriate knowledge about the transmission channel or the decoding options at the reception end. The invention is therefore distinguished in particular by its user-friendliness.

In a further embodiment of the invention, provided at the control device is a display input device which makes it possible for a user to preset an encoding format to be used. It is thus possible to select the correct encoding format even when the format suiting the selected transmission device or storage device or decoding device is not known and also detection by means of the test signal is not possible. It is particularly preferred in that respect that the user can select from predetermined formats; it is however also possible for the user to completely freely preset a given encoding procedure or even entirely prevent an encoding procedure.

Further advantageous embodiments of the apparatus according to the invention are set forth in the appendant claims.

The invention will now be described in greater detail by means of an embodiment with reference to the accompanying drawings.

DESCRIPTION OF THE PREFERRED EMBODIMENTS

Figure 1:
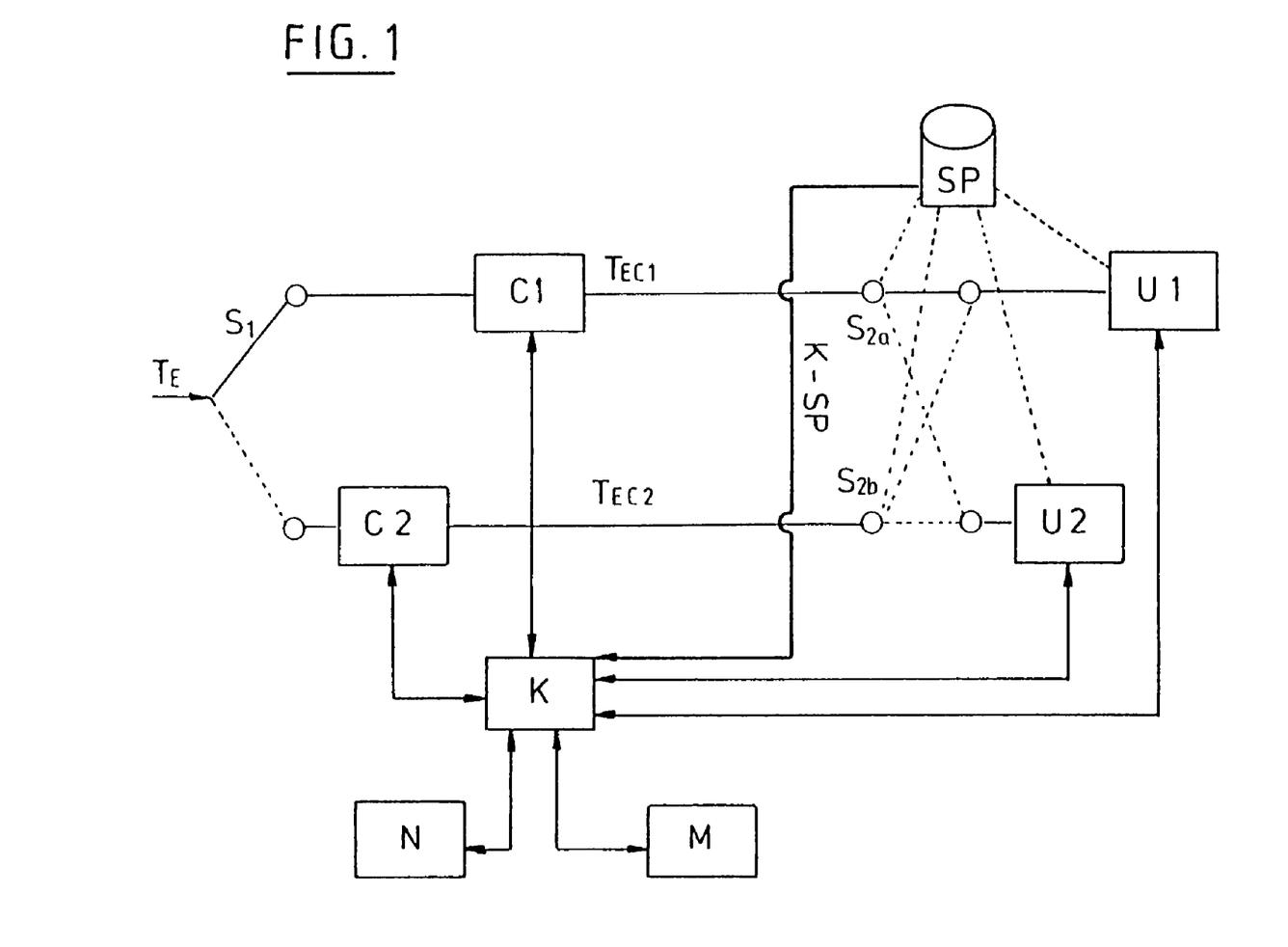
FIG. 1 is a block circuit diagram of the structure at the transmission end of an embodiment of the apparatus according to the invention for the encoding of signals or a possible implementation of the method according to the invention.

FIG. 1 shows a block circuit diagram of the structure at the transmission end of an installation for carrying into effect an embodiment of the method according to the invention. Referring to FIG. 1, a digitized monophonic audio signal $T_E$ is passed to one of the available encoding algorithms C1 or C2, according to a switch position of a switch S1. The output signal $T_{EC1}$ or $T_{EC2}$ of the encoding algorithm stage C1 or C2 respectively is passed to transmission channels U1 or U2 or a storage unit SP, according to a switch position of switches $S_{2a}$ and $S_{2b}$. The signal $T_{EC1}$ or $T_{EC2}$ stored in the storage unit SP can be passed at a later time to one of the transmission channels U1 or U2. The control of the switches S1, $S_{2a}$ and $S_{2b}$ regulates a control unit K in dependence on properties or parameters of the desired encoding format, which are set at a user interface N serving as an input/display device and/or stored in a parameter storage means M. In addition the control unit K can control the switches S1, $S_{2a}$ and $S_{2b}$ in dependence on a test signal previously sent to the lines U1 or U2 respectively or to the storage device SP. The test signal gives the control unit K the information about the properties or parameters of the channels U1 or U2 or the storage device SP. For signal communication between the storage device SP and the control unit K, an additional direct connection K-SP can be made. With those items of information, the control unit K then selects the encoding format C1 or C2 corresponding to those properties or parameters, by suitably positioning the switch S1. Thus in particular the parameter bit rate of the encoding algorithm stage C1 or C2 is set by the control unit K in dependence on the parameters set at the user interface N and/or the parameters stored in the parameter storage means M and/or the necessary parameters, which are detected by the test signal, for the transmission channels U1 and U2 respectively.

A user can select by means of the user interface N receiver parameter sets E1, E2 or E3 (not shown), using a switch (not shown) and read out the data thereof, for example bit rate, transmission channel and possibly also encoding algorithm, from the parameter storage means M. By means of the user interface N the user can also alter and store or override the parameters of the receiver parameter sets so that the parameters of the interface N and not those of the parameter storage means are used. That may be necessary by virtue of the current transmission and/or storage to be implemented.

Figure 2:
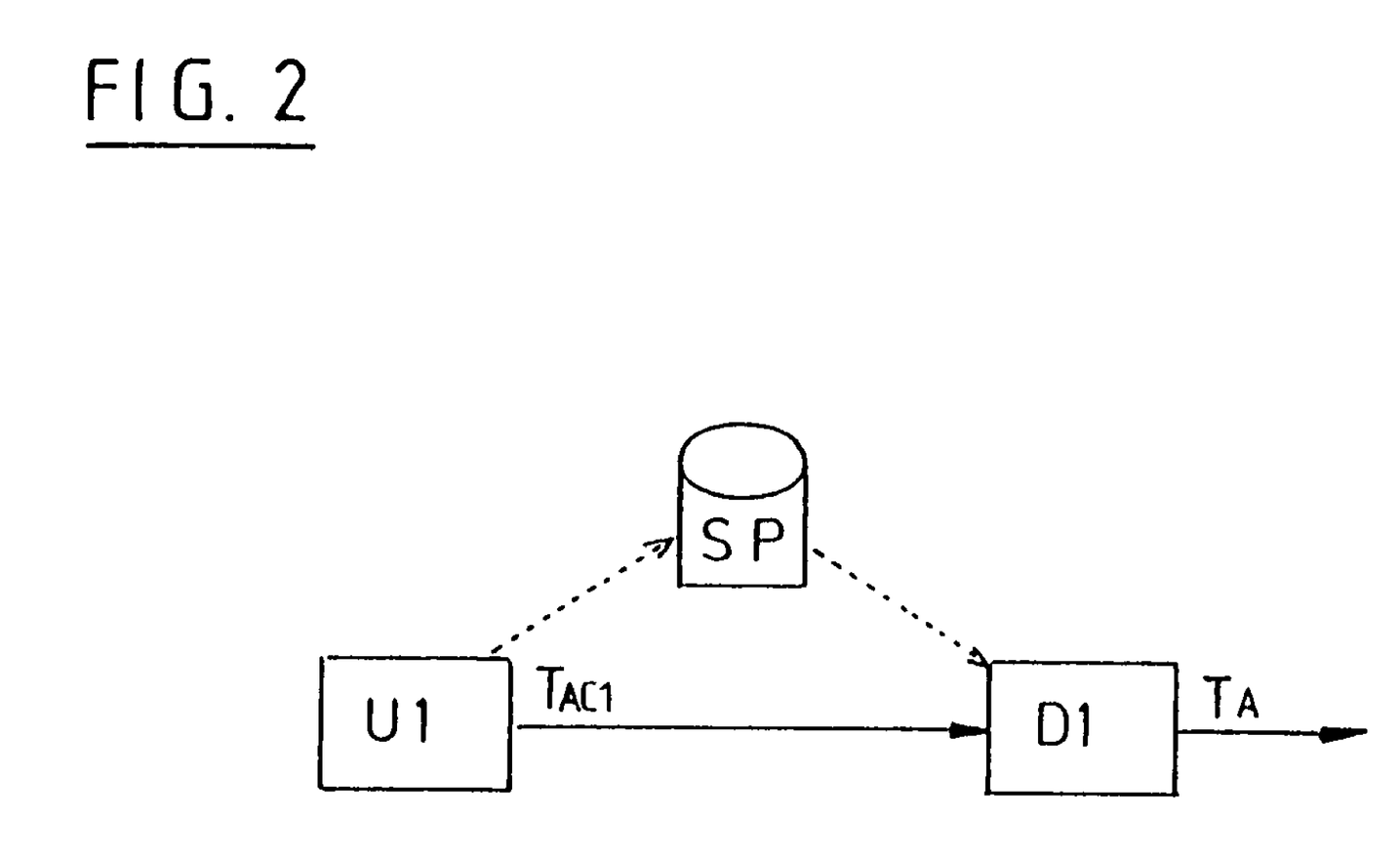
FIG. 2 is a block circuit diagram of a decoding and storage device at the reception end for further illustrating the invention.

To illustrate the invention FIG. 2 shows a block circuit diagram of a device at the transmission end. In regard to the parameters used there this device corresponds to the receiver parameter set E1 from FIG. 1. The output signal $T_{AC1}$ of the transmission channel U1 is passed to the decoding algorithm stage D1 and there decoded in accordance with the decoding specification. Alternatively or simultaneously the output signal $T_{AC1}$ of the transmission channel U1 can also be passed to the storage unit SP. The output signal of the decoding algorithm stage $T_A$ is a digitized monophonic audio signal.

By virtue of the method according to the invention the decoding algorithm of the decoding algorithm stage D1 was established for example by the control unit K by a test signal sent to the decoding algorithm stage. Encoding (see FIG. 1) was therefore implemented in a mode adapted to the detected decoding algorithm stage. Decoding is thus effected by D1 without any problems, at the reception end.

The invention further concerns firstly a recording, processing and transmission apparatus of a first type for the storage, processing and transmission of audio signals, with an analog audio signal input, in particular a microphone or a microphone input connection, a converting device for processing analog audio signals to digital audio data and a storage medium for the storage of the digital audio data; secondly a recording, processing and transmission apparatus of a second type for the storage, processing and transmission of audio data, with an input connection for digital audio data and a storage medium for the storage of the digital audio data; and thirdly a reproduction apparatus for the reproduction of audio signals with a headset or headset connection, a converting device for processing digital audio data to analog audio signals and a storage medium for the storage of the digital audio data.

Apparatuses of that kind, in which analog signals are digitized and then stored on a digital storage medium are known. Such apparatuses can generally also record audio data which are fed in digitally, directly on to the digital storage medium. Such apparatuses are also known, in which the digitally stored audio data can be reproduced after digital/analog conversion by way of an analog audio output, in particular a headset or a headset connection.

Apparatuses of that kind are used with different functional extents for example in the hi-fi sector. Depending on the equipment involved in the apparatus hi-fi devices of that kind are suitable for recording, processing and/or reproducing the audio signals. Different storage media are required, depending on the recording standard used. When using the DAT-standard (Digital Audio Tape) and the DCC-standard (Digital Compact Cassette) the storage medium for storage of the digital and data-reduced audio data is a magnetic tape. In the case of a further standard, the MD (Mini-Disk), magneto-optical storage disks as storage media are used for storage of the digital audio data which are data-reduced from psycho-acoustic points of view.

With the recording, processing, transmission and reproduction apparatuses of the general kind set forth, the audio signals are stored in digitized form on the storage medium and can be processed and/or handled by playback with simultaneously fresh recording by means of a further apparatus. The storage medium on which the audio data are stored can be removed from the apparatus and kept for later use if the stored audio data are not required for the time being. Fresh audio data can be stored by erasing and playing over audio data which are no longer required or using a storage medium which has not yet been used.

For the situation where the stored audio data are required at another location, the situation is mainly that the storage medium such as for example the cassette or disk is taken to the desired location. When it has arrived there the storage medium is inserted into a suitable reproduction apparatus so that the stored digital audio data can be processed or reproduced after digital/analog conversion as analog audio signals.

The object of this further invention is to develop the apparatuses of the general kind set forth, in such a way that in particular processing and transmission of audio data are accelerated and operation of the apparatus is facilitated.

In the recording, processing and transmission apparatuses and in the reproduction apparatus of the kind set forth above, in accordance with the invention that object is attained in that the storage medium is intended for constantly remaining in the respective apparatus and the apparatus has a respective interface for transmission of the digital audio data to a processing device which is external to the apparatus.

The advantages of this invention are in particular that the audio data can be transmitted by way of the interface in a simple fashion. In that respect, in a first step the digital audio data can be transmitted to a computer in order then in a second step to be communicated by way of a data remote transmission line or by means of an electronic mail system to locations which are further away. By virtue thereof it is advantageously no longer necessary for the storage medium itself to be transported from one location to the others. The period of time from the moment of recording an audio signal, for example by means of an apparatus of the first or second type, to the moment of reproducing the recorded audio signal, for example by means of an apparatus of the third type, is considerably reduced. In addition there is no longer the danger that the storage medium suffers damage or is lost during transportation of the audio data.

The design according to the invention can be carried into effect with a cable-less or cabled interface.

In addition the apparatus according to the invention saves on numerous precision-engineered components which permit interchange of the storage medium in the case of the known apparatuses. The manufacturing cost of the apparatus is reduced by virtue of the saving on the precision-engineered components. At the same time the level of reliability of the apparatus is increased as in particular the precision-engineered components of an apparatus are the cause of failures and problems.

In a preferred embodiment the apparatus according to the invention of the first type has an analog high level input connection and/or a digital input connection for audio signals. Those connections make it possible for the apparatus according to the invention also to record, process and transmit signals from the conventional analog or digital recording and reproducing apparatuses.

In a particularly preferred embodiment, the apparatuses according to the invention of the first and second types have a converting device for processing digital audio data to analog audio data in order to permit reproduction of the stored digital audio data as analog audio signals.

In a desirable development the apparatuses according to the invention have a headset or at least one headset output connection so that the stored audio data, after digital/analog conversion, can be acoustically reproduced.

The required storage space for storage of the digital audio data can be reduced in a particularly preferred fashion by the digital audio data being converted into a data-reduced format. For that purpose the apparatuses according to the invention have a converting device for converting the digital audio data into a data-reduced format, for example in accordance with the MPEG, AAC, AC3 or ATRAC-standard.

The preferred embodiments described hereinafter relate both to the recording, processing and transmission apparatuses according to the invention of the first and second types and also the reproduction apparatus according to the invention.

In the apparatuses according to the invention the storage medium is preferably a flash-RAM or a dynamic RAM. Further precision-engineered components are saved by virtue of using RAM-units of that kind. That means that the level of reliability of the apparatuses is further enhanced for the reasons set out above. In addition, the use of RAM units makes it unnecessary to use a motor for transporting a magnetic storage tape or a magneto-optical disk so that energy can also be saved during operation.

The interface for cable-less transmission of the digital audio data to a processing device which is external to the apparatus is particularly preferably provided for bi-directional data transmission. It is thus possible to transmit not only digital data from the apparatuses to external processing devices but also from the external processing devices to the apparatuses according to the invention.

Preferably the interface is an infra-red interface which affords a high data transmission rate with at the same time good transmission quality.

In a further preferred embodiment of the apparatuses the digital audio data are stored in the data-reduced format in the storage medium. That permits better utilisation of the storage capacity present in the storage medium. Particularly preferably, the digital audio data are also transmitted in the data-reduced format by way of the cable-less transmission interface. That markedly speeds up the transmission of the audio data to a processing device which is external to the apparatus.

In addition preferably provided on the apparatuses is an analog high level output connection and/or digital output connection for audio signals. That permits data transmission in analog or digital form to known recording and reproducing apparatuses.

Preferably the apparatuses according to the invention also have a converting device for decoding data-reduced audio data so that, besides data reduction prior to storage of the audio data, decoding of the data-reduced audio data is also possible before same are transmitted to the digital output connection or to the digital/analog processing unit.

For the input of control commands for controlling the apparatuses, the apparatuses according to the invention preferably have an input device. The apparatuses also preferably have a display device for displaying corresponding items of status or control information.

So that the recording, processing and transmission apparatuses according to the invention and the reproduction apparatus according to the invention can be used in a versatile manner, they are advantageously of a portable configuration, in a light compact casing.

Figure 3:
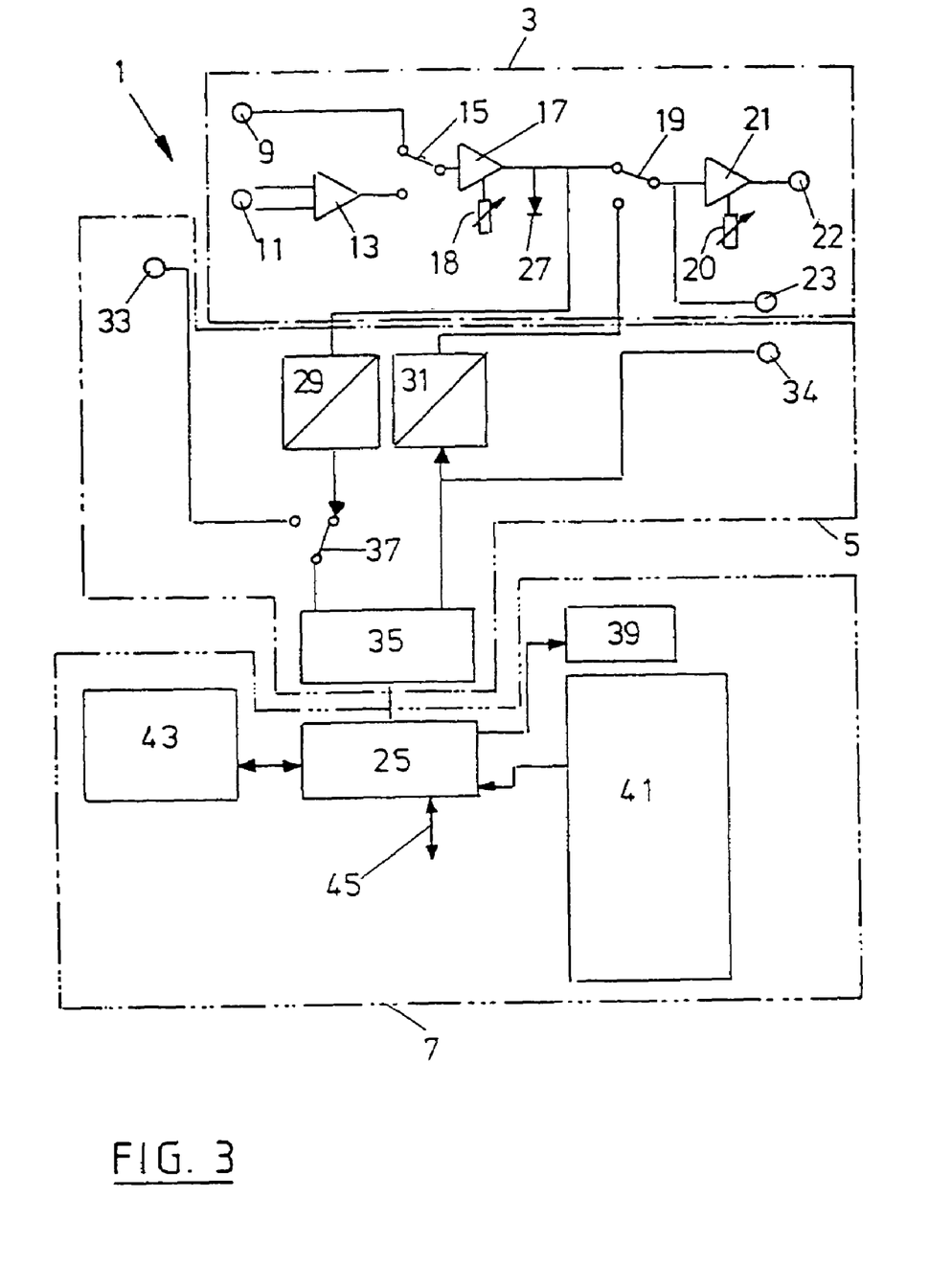
FIG. 3 is a block circuit diagram of the apparatus according to the invention.

The apparatus 1 illustrated in FIG. 3 includes three apparatus regions, more specifically an analog signal processing region 3, a digital signal processing region 5 and a digital interface region 7.

The analog signal processing region 3 includes a line-in input connection 9, a microphone input connection 11 which is connected to a microphone pre-amplifier 13, a first change-over switch 15 with which a downstream-disposed input amplifier 17 is connected either to the microphone pre-amplifier or the line-in input connection, a second change-over switch 19 with which a source can be selected for a downstream-disposed headset amplifier 21 or a line-out output connection 23 and a headset output connection 22.

A microphone signal at the microphone input connection 11 is raised by the microphone pre-amplifier 13 to the level which is typical for the line-in input connection 9. The first change-over switch 15 selects whether the microphone signal or the signal at the line-in input connection 9 is passed along as the input signal. The first change-over switch 15 is controlled by a microcontroller 25 which is to be functionally associated with the digital interface region 7. The input amplifier 17 serves for level setting of the input signal, the level of the input signal being effected by means of a level control 18 in the input amplifier 17, by way of the microcontroller 25. In that case a downstream-disposed peak LED 27 can warn of overdriving of a downstream-disposed analog/digital converter 29 which belongs to the digital signal processing region 5.

The second change-over switch 19 which is also controlled by way of the microcontroller 25 selects which analog signal is passed to the headset amplifier 21 and at the same time the line-out output connection 23. This can be either the signal coming from the input amplifier 17 or the analog signal of a digital/analog converter 31 which is also a component of the digital signal processing region 5.

The headset amplifier 21 serves to supply a connected external headset (not shown), wherein volume is controlled by means of a level control 20 integrated in the headset amplifier, also by the microcontroller 25.

The digital signal processing region 5 includes the analog/digital converter 29, the digital/analog converter 31, a digital input connection 33, a digital output connection 34, the digital signal processor 25 (DSP) and a third change-over switch 37.

The analog/digital converter converts the signal from the input amplifier 17 into a linear data signal which is transmitted to the digital signal processor 35. The digital/analog converter 31 converts a linear data signal which comes from the digital signal processor 35 and which is also applied to the digital output connection 34 into an analog output signal which is passed to a connection of the second change-over switch 19. By way of example, the 24-bit converters from Crystal can be used as the analog/digital converter 29 and the digital/analog converter 31. The digital input connection 33 and the digital output connection 34 correspond in terms of their properties to the Sony/Philips standard which originates from consumer technology.

The digital signal processor 35 is responsible for conversion from and into a data-reduced format. In this respect in particular the MPEG audio format is favoured as this represents an audio format which is already wide-spread. For example, the Motorola-56302-DSP device is suitable as the digital signal processor 35. The third change-over switch 37 connects the signal input of the digital signal processor 35 either to the output of the analog/digital converter 29 or to the digital input connection 33. In that case control of the third change-over switch 37 is again effected by the microcontroller 25.

The digital interface region 7 includes a display device 39, an input device 41, a storage medium 43, as a cable-less interface an infra-red interface 45 and the microcontroller 25. It will be appreciated that it is also possible to implement an interface with cable.

In this case the display device 39 can be formed by an LC compact display with a dot matrix, for example the PG12232-D from Actron. In this case actuation of the display device 39 is effected directly by the microcontroller 25. The input device can comprise pushbuttons or keys which are connected by way of a matrix to the microcontroller 25. The storage medium 43 which is either a flash-RAM or a dynamic RAM (SD-RAM) should have at least a storage capacity of 30 Megabytes. In this case the storage medium 43 is fixedly integrated into the apparatus, in which respect subsequent enlargement is neither intended nor possible. An increase in the storage capacity of the storage medium 43 can however be effected by suitable personnel by the subsequent insertion of other memory components.

The infra-red interface 45 serves for loading and unloading the audio data and co-operates directly with an external processing apparatus, for example a personal computer (PC) (not shown). In this respect the infra-red interface preferably complies with the IrDA 1.1 standard and has a data transfer rate of 115 kbit/s to 4 Mbit/s. In a situation involving connection by way of a PC the apparatus 1 has the status of a slave device. The initiative for constituting a connection is always from the PC, that is to say the interface is admittedly always ready to receive but it transmits only when it is requested to do so. While the apparatus communicates with the PC, it is controlled from the PC by means of a suitable computer program. For example the Sharp RY5HD01 IrDA Communication Unit can be used as the component for the infra-red interface.

The microcontroller 25 controls the different components of the apparatus 1. For example a type of the 8051 family (8-bit microcontroller) up to the Motorola 16-bit controllers of the 68000 series is suitable as the component.

In the apparatus 1, the energy supply (not shown) is a (rechargeable) battery. When using dynamic RAM components, the battery also supplies them in the standby mode. In order to prevent a voltage failure during replacement of the battery, an additional battery, for example a button cell, is provided in the case where dynamic RAM components are used. That arrangement is not required when using flash RAM components. Furthermore, the apparatus 1 has the possibility of supplying energy by way of an external mains unit. The lowest possible level of energy consumption is always a factor to be borne in mind when selecting all components. Components for a supply voltage of 3V are preferably employed.

In the recording mode, depending on the position of the third change-over switch 37, either the digital audio data of the digital input connection 33 or the digital audio data from the analog/digital converter 29 are switched to the input of the digital signal processor 35. The digital audio data are converted by the digital signal processor 35 into a data-reduced format, for example into an MPEG data stream, and transmitted by way of an output of the digital signal processor 35 to the microcontroller 25 and stored by same in blocks in the storage medium 43. In that case the free storage capacity of the storage medium 43 is continuously checked and represented in the display device 39.

If audio data are to be reproduced, firstly the audio data are read block-wise out of the storage medium 43 and transferred by the microcontroller 25 to the digital signal processor 35. An output of the audio data is now implemented by way of the digital output connection 34 and, after digital/analog conversion, in the form of an analog audio signal, also by way of the line-out output connection 23 and the headset output connection 22.

When transmitting and receiving data by way of the infra-red interface 45, the digital audio data are transferred to or received from a connected PC in the data-reduced format, for example in the MPEG format.

Figure 4:
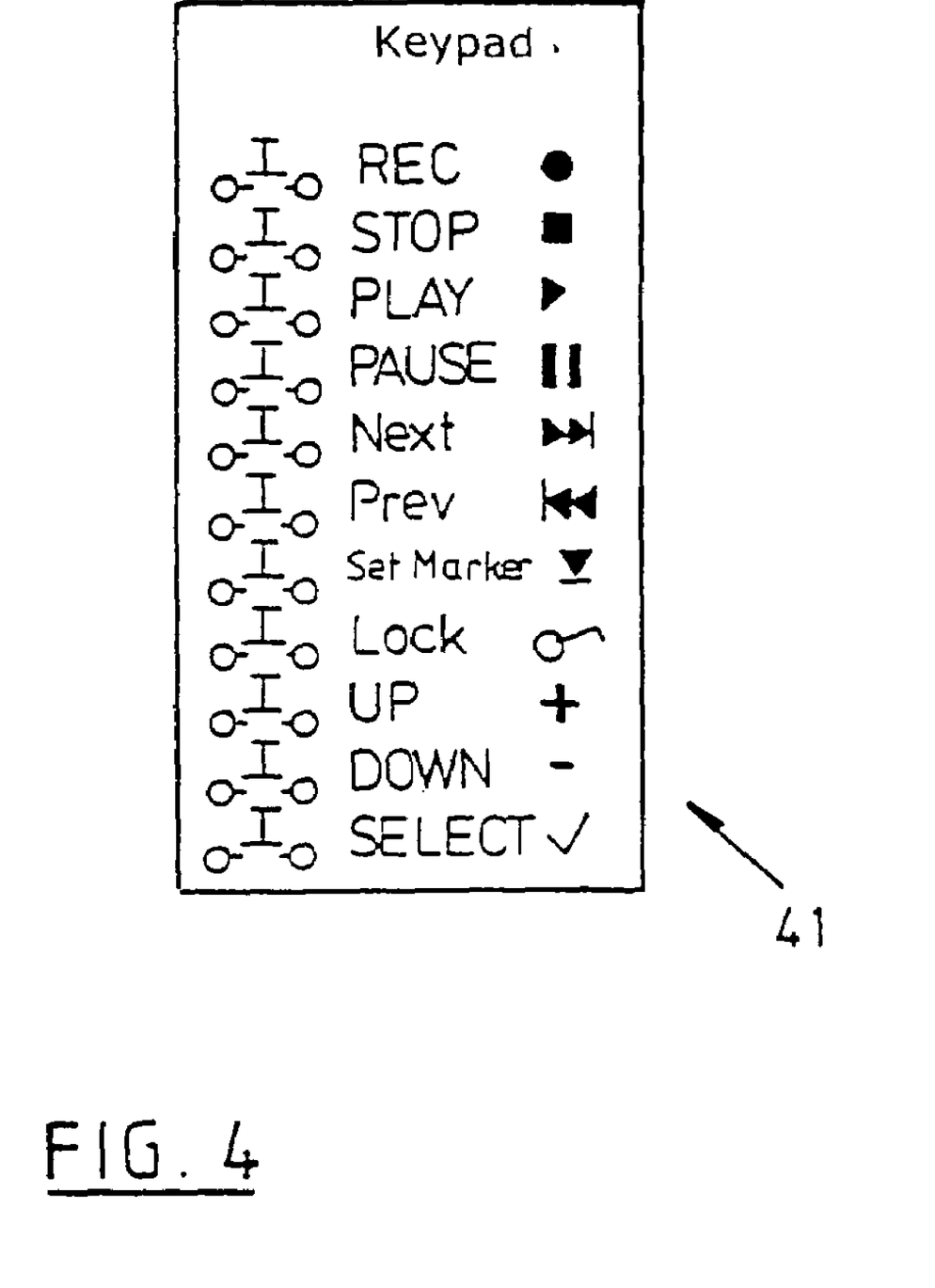
FIG. 4 is a diagrammactic view of the input device of the apparatus shown in FIG. 3.

FIG. 4 diagrammatically shows an input device which can also be used in the apparatus 1 shown in FIG. 3. The input device comprises pushbuttons or keys connected to a microcontroller by way of a matrix. The input device in the illustrated embodiment includes REC-, STOP-, PLAY-, PAUSE-, NEXT-, PREV-, SET MARKER-, LOCK-, UP-, DOWN- and SELECT-keys. In the operating procedure of the apparatus 1 there is essentially associated with each key a mode which identifies the operating state or condition in which the apparatus is after the corresponding key has been pressed. In its operating procedure the apparatus can assume in particular a REC-, STOP-, PLAY-, REC-PAUSE-, PLAY-PAUSE, NEXT-, PREV-, SET MARKER-, LOCK-, UP-, DOWN- or SELECT-modes. Further modes are possible if the apparatus is actuated by means of a menu control. In dependence on the current mode, only certain keys are activated and can be used for controlling the apparatus.

The REC-key can be actuated in the REC-PAUSE- or STOP-mode and serves to start a recording. Each new recording is characterised as a new article. While the recording is running the apparatus 1 is in the REC-mode. In the REC-mode the STOP-key and the SET MARKER-key can be actuated. The current recording is terminated by actuation of the STOP-key; the apparatus goes into the STOP-mode. Pressing the SET MARKER-key which is also possible in the PLAY-mode marks the location which is just being recorded by the apparatus (REC-mode) or reproduced (PLAY-mode). A marking which is set in that way is stored together with the audio data in the storage device and serves for easily retrieving the correspondingly marked locations.

Pressing the PAUSE-key interrupts recording and puts the apparatus into the REC-PAUSE-mode. The apparatus can also go into that mode when the REC- and PAUSE-keys are pressed at the same time in the STOP-mode. Recording is suspended in that mode but it is possible to modulate an input signal to a desired level. Pressing the STOP-key causes the apparatus to go into the STOP-mode while pressing the REC-key or the PAUSE-key causes it to revert to the REC-mode. When the machine jumps from the REC-PAUSE-mode into the REC-mode, no new article is created, but recording of the current one is continued.

The PLAY-key can be actuated in the PLAY-PAUSE- or STOP-modes and serves to start reproduction or playback. During reproduction the apparatus 1 is in the PLAY-mode. In the PLAY-mode the STOP-key and, as described above, the SET MARKER-key can be actuated. Reproduction is terminated by actuation of the STOP-key; the apparatus again goes into the STOP-mode. Pressing the PAUSE-key interrupts reproduction and puts the apparatus into the PLAY-PAUSE-mode. Pressing the STOP-key puts the apparatus into the STOP-mode while pressing the PLAY-key or the PAUSE-key puts the apparatus back into the PLAY-mode.

The NEXT-key and the PREV-key are activated in the STOP-, PLAY- and PLAY-PAUSE-mode and serve to jump from a stored article to the next one or the previous one. In the PLAY-mode, upon actuation of the PLAY-key, it is also possible to provide for fast forward with acoustic monitoring, in which each n-th audio frame is reproduced.

The LOCK-key which can also be in the form of a latching switch serves to lock all functions and the infra-red interface.

The UP-, DOWN-, and SELECT-keys are used to actuate further functions, for example level control, erasing individual or all articles, jumping to individual markings, erasing individual or all markings and setting or altering a time monitoring action for individual articles. In this respect the selection of the individual functions is essentially on a menu-controlled basis.

The keys are subdivided into three groups, with a priority stage being attributed to each group. In the first group Prio_1 are the keys which when operating the apparatus are found and operated 'blind'. These are the RECORD-, STOP- and SET-MARKER-keys. The second group Prio_2 includes the keys which are occupied by a fixed function. This includes the PLAY-, PAUSE-, NEXT-, PREV- and LOCK-keys. The third group Prio_3 is formed by the multi-function keys to which different functions are attributed in dependence on the operating condition of the system or the menu control. The functions which are associated with those keys at the time are correspondingly displayed in the display device. This group includes the UP-, DOWN- and SELECT-keys. Instead of the UP- and DOWN-keys it would also be possible to use an angle sensor operating wheel.

In order to ensure that the keys in group Prio_1 can be found and operated 'blind', they are arranged in such a way that they are easily accessible for a user on the apparatus. The size and shape of these keys can also make it easier for them to be easily found and actuated. The keys of groups Prio_2 and Prio_3 are arranged in such a way that they cannot be by mistake actuated or electronically deactivated. It is also possible to provide for those keys to be mechanically covered over.

Figure 5:
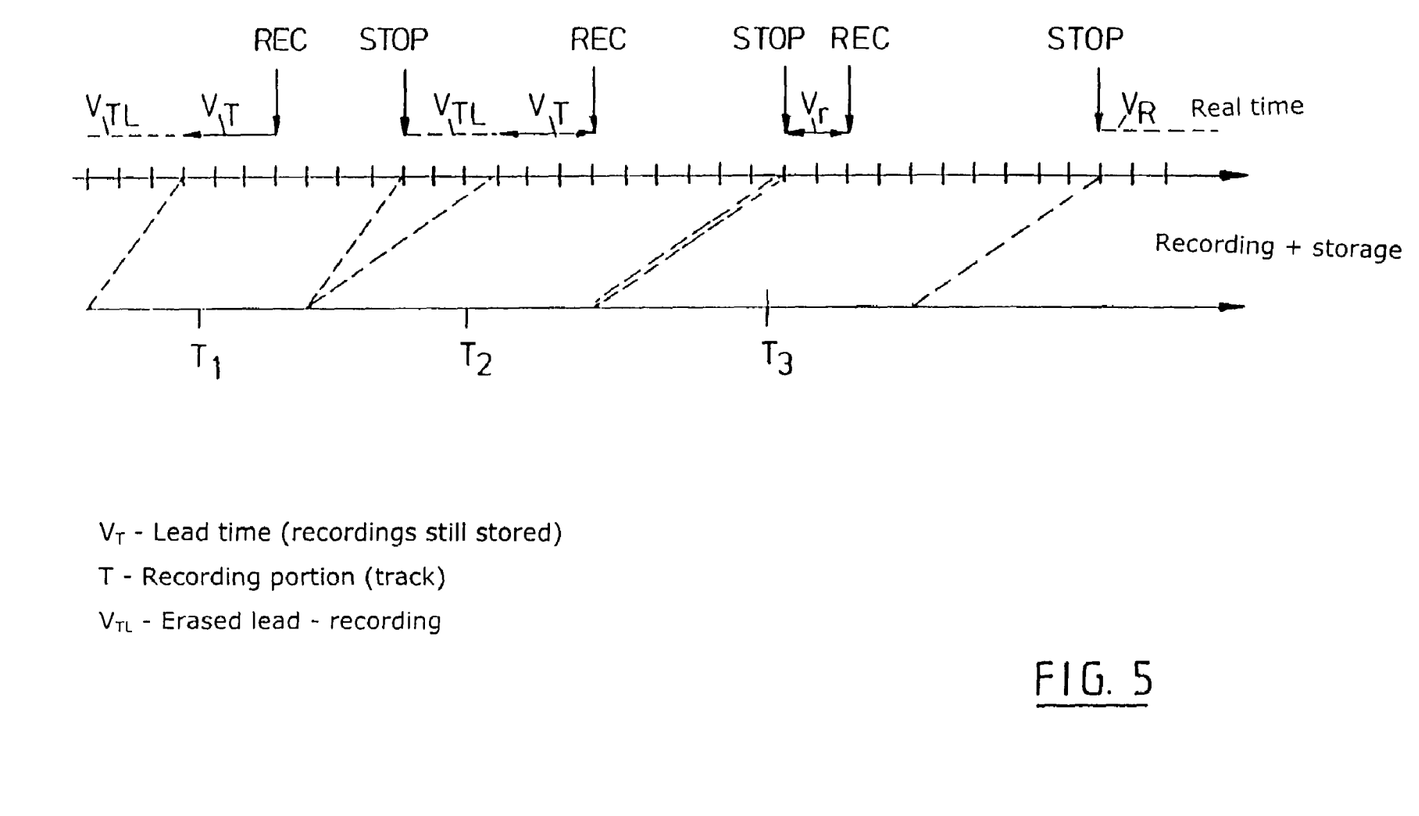
FIG. 5 is a time-presentation diagram of an audio recording.

It is also possible and desirable for the recording, processing and transmission apparatus according to the invention already to be put into the recording condition prior to actuation of the recording input device in the form of the REC-key. This means that audio signals are recorded and stored on the basis of the FIFO-principle (First-In-First-Out) for a predetermined period of time (lead time) when the REC-key has not yet been actuated at all. It can be provided for example that the audio information of a predetermined previous period of time, for example the last five minutes, is always recorded and retained in the memory. When now the REC-key is pressed, the audio data which were recorded during the period of time prior to actuation of the REC-key are still stored and form a part of the overall recording which is defined by the REC-key. The foregoing measure affords the advantage that, if the user of the recording apparatus should have pressed the REC-key too late, it is nonetheless guaranteed that the complete recording wanted is in fact recorded and no audio information of the desired recording is missed in spite of the REC-key having been actuated late. It will be appreciated that it is also possible for the lead time, that is to say the time unit of the constantly stored information also to be set by the user individually by means of the input device. The pre-recording time is regularly considerably shorter than the time for which audio signals can be stored in the recording device. If for example audio signals can be stored in the recording device for one hour, the pre-recording time can be in the range of 30 seconds to 5 minutes. FIG. 5 shows what the content of a plurality of recording articles look like in terms of elevation in respect of time, when recordings have been implemented several times and at various times by actuating the REC-key.

It will be seen from FIG. 5 that, when the REC-key has been actuated at various times, the recording like the actual recording portion T (track) is also always retained a short period of time prior to actuation of the REC-key-VT-lead time (recording still stored). The recording which is before the lead time is erased on the basis of the FIFO-principle. FIFO means in this respect that the incoming audio data of a given period of time are stored and erased in accordance with the First-In-First-Out principle.

Both the moments in time and the periods of time VTL, VT and also REC can be provided with a marking (index) by way of the input means so that they can be retrieved again and the actual track beginning can also be edited.

Fast forward/rewind is provided as a further feature of the recording, processing and transmission device. In this respect it is also possible to provide various stages of a fast forward/rewind. In the fast forward/rewind mode, only each n-th frame is reproduced, with n being a number of greater than 2. In fast forward or rewind the decoder also receives a faster working clock so that the audio signal is played back at a higher pitch. It is however also possible in fast forward and rewind to retain the pitch of the reproduction mode or not to adapt the pitch of the audio signal, with scanning of the original pitch.

Finally it is also possible with the input means of the recording and transmission apparatus to input with the audio signals to be recorded items of information about address data such as for example ISDN or e-mail data so that those items of address data information which are associated with the audio signals to be recorded can be evaluated by the microcontroller 25 or the external processing device so that for example the recorded recording information is automatically sent to the desired address.

The described recording, processing and transmission apparatus is particularly well suited as a recording device for journalists who would like to send the audio recording with the best possible recording quality quickly and safely to their editors so that the article can be published in the media as quickly as possible.

Set out hereinafter are further embodiments of the invention (with reference numerals in relation to the drawings):

Embodiment 1

Recording, processing and transmitting apparatus 1 for storage, processing and transmission of audio signals, having an analog audio signal input 9, 11, in particular a microphone or a microphone input connection 11, a converting device 29 for processing analog audio signals to digital audio signals and a storage medium 43 for storage of the digital audio data, with the further features that the storage medium 43 is intended to constantly remain in the apparatus 1 and the apparatus 1 has an interface 45 for transmission of the digital audio data to a processing device which is external to the apparatus.

Embodiment 2

Apparatus according to embodiment 1, with an analog high level input connection 9 and/or a digital input connection 33 for audio signals.

Embodiment 3

Recording, processing and transmission apparatus 1 for storage, processing and transmitting audio data, having an input connection 33 for digital audio data and a storage medium 43 for storage of the digital audio data, with the further features that the storage medium 43 is intended to constantly remain in the apparatus 1 and the apparatus 1 has an interface 45 for cable-less transmission of the digital audio data to a processing device which is external to the apparatus.

Embodiment 4

Apparatus according to one of the preceding embodiments having a converting device 31 for processing digital audio data to analog audio signals.

Embodiment 5

Apparatus according to embodiment 4, having a headset or a headset output connection 22.

Embodiment 6

Apparatus according to one of the preceding embodiments, having a converting device 35 for converting the digital audio data into a data-reduced format.

Embodiment 7

Reproduction apparatus 1 for reproduction of audio signals, having a headset or headset connection 22, a converting device 31 for processing digital audio data to analog audio signals and a storage medium 43 for storage of the digital audio data, with the further features that the storage medium 43 is intended to constantly remain in the apparatus 1 and the apparatus 1 has an interface 45 for cable-less transmission of the digital audio data to a processing device which is external to the apparatus.

Embodiment 8

Apparatus according to one of the preceding embodiments having the further features that the storage medium 43 is a flash-RAM or a dynamic RAM.

Embodiment 9

Apparatus according to one of the preceding embodiments, having the further features that the interface 45 is intended for bi-directional data transfer.

Embodiment 10

Apparatus according to one of the preceding embodiments, having the further features that the interface 45 is an infra-red interface.

Embodiment 11

Apparatus according to one of the preceding embodiments, having the further features that the digital audio data are stored in the data-reduced format in the storage medium 43.

Embodiment 12

Apparatus according to one of the preceding embodiments, having the further features that the digital audio data are transmitted in the data-reduced format by way of the cable-less transmission interface 45.

Embodiment 13

Apparatus according to one of the preceding embodiments, having an analog and/or a digital audio output connection 23, 24.

Embodiment 14

Apparatus according to one of the preceding embodiments, having a converting device 35 for decoding data-reduced audio data.

Embodiment 15

Apparatus according to one of the preceding embodiments, having an input device 41 for the input of control commands for controlling the apparatus 1.

Embodiment 16

Apparatus according to one of the preceding embodiments, having a display device 39 for the display of items of control information.

Embodiment 17

Apparatus according to one of the preceding embodiments, having the further features that the apparatus 1 is portable.

Embodiment 18

Apparatus according to one of the preceding embodiments, having the further features that the recording apparatus is continuously in the recording mode and records audio signals even if a recording input device provided for that purpose has not yet been actuated.

Embodiment 19

Apparatus according to embodiment 18, having the further features that audio signals are recorded and put into intermediate storage as long as the recording input device has not yet been actuated, for a predetermined past period of time, and, for the situation where the recording input device is actuated, audio signals which have already been recorded form part of that overall recording which is defined by actuation of the recording input device.

Embodiment 20

Apparatus according to one of the preceding embodiments, having the further features that the apparatus has means for the input and storage of items of electronic address information, for example ISDN- or e-mail data and that the electronic address information associated with recorded audio signals can be evaluated in a defined manner by the apparatus or the processing device which is external to the apparatus.

Embodiment 21

Apparatus according to one of the preceding embodiments, having the further features that the apparatus has a single-stage or multi-stage fast forward and/or rewind, in which only each n-th data frame is played back and n is greater than 1.

Embodiment 22

Apparatus according to embodiment 21, having the further features that the decoder is clocked faster or operates faster than in normal reproduction and the audio signal is played back at a higher pitch.

Embodiment 23

Apparatus according to embodiment 21, having the further features that in fast forward and/or rewind of the audio signal the decoder operates faster or is clocked faster than usual and the pitch of the audio signal is adapted by sub-sampling of the original pitch.

Embodiment 24

Apparatus according to one of the preceding embodiments, having the further features that the interface is in the form of a cable-less or cabled interface.

While the foregoing description and drawings represent the present invention, it will be obvious to those skilled in the art that various changes may be made wherein without departing from the true spirit and scope of the present invention.

What is claimed is:

1. A method of encoding signals, in particular digitized audio signals, the method comprising the steps of:
    providing an encoding device for encoding a signal in an encoding format;
    providing a processing device for processing the encoded signal; and
    providing a control device for determining the encoding format, wherein the encoding format corresponds to at least one property of the processing device, and wherein the control device determines the encoding format by carrying out at least the following steps:
        transmitting a test signal to the processing device, wherein the test signal is transmitted by a test signal generator of the control device; and
        detecting at least one property of the processing device.

2. The method as set forth in claim 1, wherein the processing device includes at least one of a transmitting device for transmission of the encoded signal and a storage device for storage of the encoded signal and a decoding device for decoding of the encoded signal.

3. The method as set forth in claim 1, wherein the processing device is a transmission device for transmission of the encoded signal, and wherein the transmission device is used for simultaneously transmitting and receiving the encoded signal.

4. The method as set forth in claim 1, wherein the processing device is a transmission device for transmission of the encoded signal and wherein the transmission device has a decoding device for simultaneous decoding upon the reception of an encoded signal.

5. The method as set forth in claim 1, wherein the encoding format corresponds to the processor power of the processing device so that the encoding format is determined in such a way that it is processed by the processing device in real time.

6. The method as set forth in claim 5, wherein the processing device is a transmission device for transmission of the encoded signal and wherein the encoding format corresponds to the power of the transmission device so that the transmission device can affect transmission in real time.

7. The method as set forth in claim 1, wherein the at least one property of the processing device is called up out of a storage means prior to encoding.

8. The method as set forth in claim 1, wherein, prior to encoding of the signal, by a display/input device, the user of the encoding device is asked to do at least one of: preset the desired encoding format and preset the at least one property of the selected processing device, and encoding is affected in accordance with the presetting.

9. The method as set forth in claim 1, wherein the signal is digitized prior to the encoding operation.

10. The method as set forth in claim 1, wherein the signal is encoded in a bit rate-reduced encoding format.

11. The method as set forth in claim 1, wherein the signal is a digitized audio signal and the signal is source-encoded having regard to psycho-acoustic phenomena.

12. The method as set forth in claim 1, wherein transmission and/or storage devices of varying capacity are available as processing devices and prior to transmission and/or storage of the signals, in the case of signals of higher quality, that is to say with a larger amount of data, a transmission device and/or storage device of larger capacity is selected and in the transmission and/or storage of signals of lower quality, that is to say with a smaller quantity of data, a transmission device and/or storage device of smaller capacity is selected.

13. The method as set forth in claim 1, wherein the signals to be sent are audio signals, wherein the audio signals are encoded in bit rate-reduced form by the encoding device, wherein a plurality of transmission channels and/or bit rates are available for transmission of the signal and wherein the transmission channel and/or the bit rate in the transmission are so selected that the signal can be transmitted in real time.

14. The method as set forth in claim 13, wherein a fixedly preset computing power is adopted for operation in real time.

15. The method as set forth in claim 1, wherein the processing device is a transmitting device for transmission of the encoded signal and wherein the transmission device has a decoding device for simultaneous decoding upon the reception of an encoded signal, and wherein a fixedly preset computing power is adopted for operation in real time and wherein with simultaneous transmission and reception in real time the encoding formats of the encoding and decoding devices are selected in accordance with the predetermined computing power.

16. The method as set forth in claim 15, wherein presetting in respect of the distribution of the computing power and thus the choice of the encoding format in regard to a preference for the encoding device or the decoding device or parity of the two is affected by an input device.

17. Apparatus for encoding signals comprising:
    an encoding device for encoding a signal in an encoding format;
    a processing device for processing the encoded signal; and
    a control device for determining the encoding format, wherein the encoding format corresponds to at least one property of the processing device, and wherein the control device determines the encoding format by carrying out at least the following steps:
        transmitting a test signal to the processing device, wherein the test signal is transmitted by a test signal generator of the control device; and
        detecting at least one property of the processing device.

18. Apparatus as set forth in claim 17, wherein, a transmission device is connected to the control device as a processing device for transmission of the signals to a receiver, wherein the encoding format corresponds to the properties of the transmission device.

19. Apparatus as set forth in claim 18, wherein the encoding format corresponds to the bit rate of the transmission device.

20. Apparatus as set forth in claim 17, having a storage device connected to the control device, as a processing device, for storage of the signals, wherein the encoding format corresponds to at least one property of the storage device.

21. Apparatus as set forth in claim 17, having a decoding device connected to the control device, as a processing device, for decoding of the signals, wherein the encoding format corresponds to at least one property of the decoding device.

22. Apparatus as set forth in claim 17, wherein the test signal is an encoded audio signal.

23. Apparatus as set forth in claim 17, wherein a display/input device is connected to the control device.

24. Apparatus as set forth in claim 17, wherein a storage unit is connected to the control device and in which at least one encoding format is stored.

25. Apparatus as set forth in claim 24, wherein the storage unit stores the properties of the processing device and the encoding formats corresponding to the at least one property of the processing device.

26. Apparatus as set forth in claim 17, wherein all settings can be implemented manually.

27. Apparatus as set forth in claim 17, wherein there is provided a display which displays the current transmission time of the transmission device/storage time of the storage device and/or the remaining transmission time of the transmission device/storage time of the storage device.

28. Apparatus as set forth in claim 17, wherein there is provided a mixing stage which prior to transmission with the transmission device and/or storage with the storage device mixes together a plurality of monophonic and/or stereophonic audio signals.

29. Apparatus as set forth in claim 17, wherein the signal which is to be transmitted with the transmission device and/or stored with the storage device and/or which is received from the transmission device can be listened to in a listening device.

30. Apparatus as set forth in claim 17, wherein the level of the signal which is to be transmitted with the transmission device and/or stored with the storage device and/or which is received from the transmission device can be displayed by a level display.

31. Apparatus as set forth in claim 17, wherein, provided for respective ones of various processing devices, is a respective control device, wherein the individual control devices exchange the properties of the processing device interrogated thereby with one or more of the other control devices.

32. Apparatus as set forth in claim 17, wherein the control device can be operated either cable-less or via a cabled interface.

* * * * *